(12) United States Patent
Haikonen et al.

(10) Patent No.: US 6,304,605 B1
(45) Date of Patent: *Oct. 16, 2001

(54) VIDEO COMPRESSING METHOD WHEREIN THE DIRECTION AND LOCATION OF CONTOURS WITHIN IMAGE BLOCKS ARE DEFINED USING A BINARY PICTURE OF THE BLOCK

(75) Inventors: Pentti Haikonen, Espoo; Janne M. Juhola; Petri Latva-Rasku, both of Tampere, all of (FI)

(73) Assignee: Nokia Mobile Phones Ltd., Salo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/793,897
(22) PCT Filed: Sep. 13, 1995
(86) PCT No.: PCT/FI95/00498
  § 371 Date: May 7, 1997
  § 102(e) Date: May 7, 1997
(87) PCT Pub. No.: WO96/08928
  PCT Pub. Date: Mar. 21, 1996

(30) Foreign Application Priority Data

Sep. 13, 1994 (FI) .......................................... 944235

(51) Int. Cl.$^7$ ................................................ H04N 7/12
(52) U.S. Cl. ........................................ 375/240.24
(58) Field of Search .................... 348/410, 420, 348/403, 441; 386/116; 382/243; 375/240.09, 240.24; H04N 7/12

(56) References Cited

U.S. PATENT DOCUMENTS

| | | | |
|---|---|---|---|
| 3,980,809 | 9/1976 | Cook | 178/6 |
| 4,783,841 | * 11/1988 | Crayson | 382/243 |
| 5,220,621 | 6/1993 | Saitoh | 382/22 |
| 5,692,012 | * 11/1997 | Virtamo et al. | 348/420 |
| 5,815,636 | * 9/1998 | Fujii et al. | 386/116 |
| 5,844,616 | * 12/1998 | Collet et al. | 348/441 |

FOREIGN PATENT DOCUMENTS

| | | |
|---|---|---|
| 0575201 A3 | 12/1993 | (EP) . |
| 0580454 A3 | 1/1994 | (EP) . |
| 0594116 A2 | 4/1994 | (EP) . |
| 0594116 A3 | 4/1994 | (EP) . |
| 0609022 A2 | 8/1994 | (EP) . |
| 92272 | 5/1992 | (FI) . |
| WO 93/23956 | 11/1993 | (WO) . |
| WO 94/00951 | 1/1994 | (WO) . |

OTHER PUBLICATIONS

"Digital Image Processing", R.C. Gonzalez, P. Wintz, 2nd Edition, 1987, pp. 176–179, 336–338.

* cited by examiner

*Primary Examiner*—Young Lee
(74) *Attorney, Agent, or Firm*—Perman & Green, LLP

(57) ABSTRACT

A video compression method, which can be applied especially in the transfer of a video signal at low transfer rates. In the method, the video picture is divided into blocks, and in order to code the picture information of a block, the pattern information of the block and the value information connected with it are first derived from the picture information of the block. For the pattern defined by the pattern information, the pattern model, which most resembles it and for which a corresponding short code has been defined, is searched for from a predefined small group of block pattern models. The code of the most resembling pattern model is set as the pattern information code, and the value information code corresponding with the value information is combined with it. In connection with the method, different methods for a closer definition can be used, if the difference between the block pattern and the block pattern model exceeds a limiting value that has been set. In reconstructing the block, the corresponding pattern model is searched for, and it is combined with the value information corresponding with the value information code. The value information of the pixels of the block and the location of the contours can be more closely defined during reconstruction by interpolating on the basis of the value information of the adjacent blocks.

13 Claims, 3 Drawing Sheets

FIG. 2

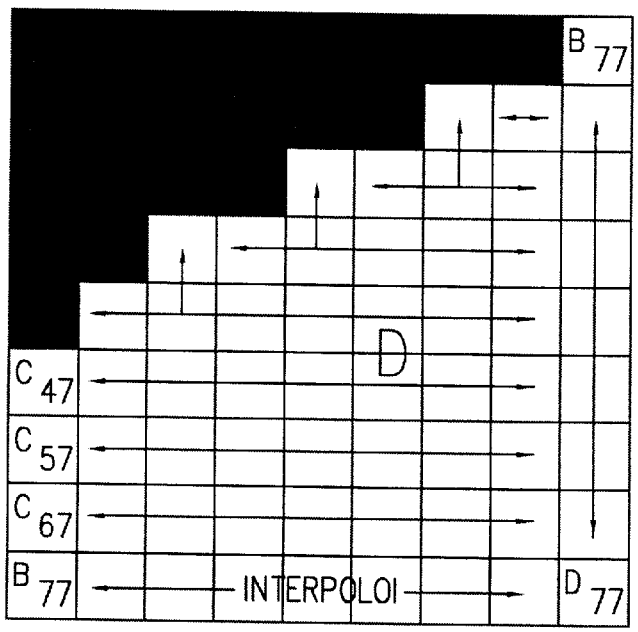
FIG. 3
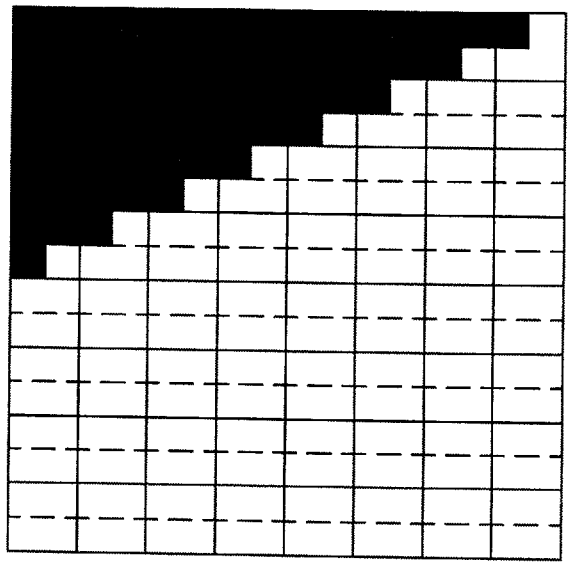
FIG. 4
FIG. 5

VIDEO COMPRESSING METHOD WHEREIN THE DIRECTION AND LOCATION OF CONTOURS WITHIN IMAGE BLOCKS ARE DEFINED USING A BINARY PICTURE OF THE BLOCK

BACKGROUND OF THE INVENTION

1. Field of the Invention

The invention relates to a video compression method, and especially to a video compression method that is intended to be applied in the transmission of a video picture as a digital video signal at very low transmission rates.

2. Description of the Prior Art

A video picture is digitized by dividing it into pixels and by giving the pixels digitized values. In a black and white picture, the value of a pixel can simply be the value of brightness of the corresponding pixel in digital form, for example, given in 8 bits. Several signals are required in order to show a color picture, and thus, the digital presentation requires, for example, Y, U and V pixels and their digitized values, which contain the information about the brightness and colors of the picture. The invention is applied in the same way in the compression of all pixel information, and that is why this application primarily refers to pixels, pixel values and value information in general.

Because of the limited capacity of the channels used specifically for transferring digital picture information, the information must be compressed before transfer. For example, in practice, when transferring a normal television picture on a UHF channel, which has a transfer capacity of 32 Mbit/s, a compression of picture information is required in a ratio of 1:10–1:20. When a video picture is transferred on a channel, which has a very low transfer rate, for example, 8 kbit/s, a very efficient compression is required even if some of the picture quality is sacrificed.

Several different techniques have been developed for compressing a video picture. These techniques are used in coding the picture information in the transmission encoder and, correspondingly, in decoding the picture information and reconstructing the picture at the receiving end. These methods include, for example, variable length coding (VLC), predictive coding, movement compensation, run-length coding, and transform coding, such as discrete cosine transform coding (DCT). To make calculations easier, a picture is usually coded in blocks. A generally used block size in 8×8 pixels. The above-mentioned methods are familiar to the persons skilled in the art, and even though some of the methods, for example, variable length coding, can also be used in the video compression method of the invention to enhance the compression, they are not described in detail here, because it is not necessary in order to understand the invention.

When transferring a video picture as a digital video signal at low transfer rates, a generally used compression method is one, in which the picture is divided in blocks of n×m pixels. The blocks are compared to the corresponding blocks of the previously processed picture. The changed blocks are identified, and their coded information and the address data, which indicate their location, are transferred. At the receiving end, this information and the information of the said previously processed picture are used to reconstruct the picture. This compression method is very economical when transferring a video picture at low transfer rates, and that is why the method of the invention is considered to be preferably applied, but not in any way limited, to this application.

The next explains the conditions of transferring a video picture in a case, in which the available capacity of the transfer channel is very low, and in which it is economical to apply the method of the invention. The QCIF resolution of the picture is 176 pixels/line, and the picture has 144 lines. The picture is divided into macro blocks of 16×16 pixels, the total amount of which is 9×11, that is 99. Each macro block contains four Y blocks (8×8 pixels) and one U block and one V block (8×8 pixels). So, the picture has a total of 4×99+2×99=594 blocks. If we assume that the capacity of the channel is 8 kbit/s and the frequency of the picture is 8.3 pictures per second, there are 963 bits available per picture. If we assume further, that the share of the changed macro blocks is 10% of the picture, there are 0.1×594, that is, about 60 blocks to be coded. Of the available 963 bits, about 50 are used to address the changed macro blocks, for example, by use of a binary run-length coded bit map. The other 910 bits are left for the picture information, so there are 910/60, that is, 15 bits available per block.

At very low transfer rates, or if the amount of changes in the picture is greater than the 10% assumed previously, one generally used method is to reduce the picture rate so that the amount of transferred picture information and, in that way, the resolution can be retained. The reduction in the picture rate is known to reduce the quality of the motion the eye can see. An alternative to reducing the picture rate is a more efficient compression, in which the aim is to present the information contained in a picture block with a smaller amount of information than previously.

OBJECT OF THE INVENTION

The object of the invention is to develop a video compression method, with which it would be possible to transfer picture information coded with a very small number of bits, and still retain the quality of the picture at a reasonable level. One object of the invention is to code with 14 bits the picture information of a block with 8×8 pixels.

Additionally, the compression method of the invention and the corresponding reconstruction method aim at retaining the continuity of the picture's contours and the contrast. The method also makes it possible to enhance the resolution of the picture by interpolating during the reconstruction, and to reconstruct the picture for a greater number of pixels without the contours becoming staggered.

In order to achieve these objects, the method of the invention is characterized in what is presented in claim 1.

SUMMARY OF THE INVENTION

In a preferred embodiment of the method of the invention, the picture is coded in blocks of 8×8 pixels or, if the coding is not accurate enough, in sub-blocks of 4×4 pixels. The information contained in the block in divided into pattern information and the value information connected with it. Usually, a block contains a pattern formed by one or two contours, in which case the pattern is defined by the contours and the borders of the block. In the method of the invention, a relatively small group of pattern models are defined beforehand, and each model is given in corresponding, relatively short code of, for example, 8 bits. The pattern models are created, so that they approximate accurately enough as many different patterns as possible. In a preferred embodiment, a pattern model that resembles most the pattern of the block is searched for, and the code defined for this patterns model is set as the pattern information code. The pattern information code is combined with a value information code corresponding with the value information connected with the pattern information.

Also, one possibility for more accurate coding is to divide the block into four smaller sub-blocks and to apply to these sub-blocks the invention's method for coding the picture information of a block by searching for the most resembling pattern models for the sub-blocks from a predefined relatively small group of sub-block pattern models, which have been defined in addition to the block pattern models.

Previously coded blocks located next to the block being coded can also be used to help the coding, and to ensure that the contours are continuous.

The method of reconstructing a block that has been compressed by using the method of the invention is characterized in what is presented in claim 12. In an advantageous embodiment of the invention the block compressed by a method according to the invention may be reconstructed to have a more pixels than the original block, without causing staggering of the contours in the block.

In the following, the invention is described in more detail, and references are made to the included figures of which:

DETAILED DESCRIPTION OF THE PREFERRED EMBODIMENT(S)

Figure 1:
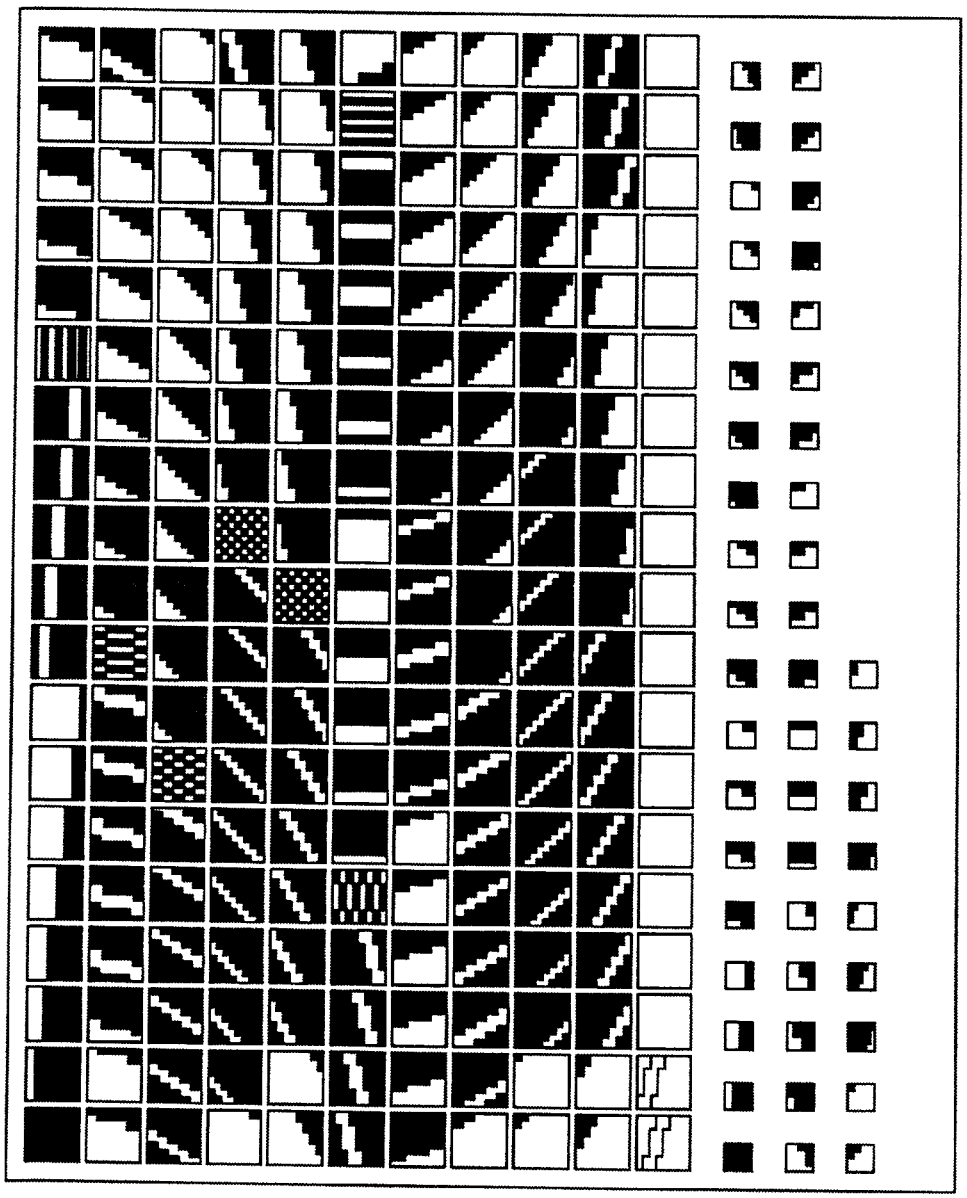
FIG. 1 shows, as binary pictures, the block and sub-block pattern models used in an embodiment of the invention, FIG. 2 show a group of pattern models presented as a contours and the corresponding direction codes of the contours in an embodiment of the invention, FIG. 3 show an example of a block, which contains one contour and which has been converted to a binary picture, FIG. 4 show interpolation of pixel value information in connection with reconstruction of a coded picture, and FIG. 5 show a example of converting an contour pattern to a pattern with a greater number of pixels.

As was already stated in the general part of the description, the basic idea of the invention is that, for coding the picture information of the block, formed by the value information of the pixels thereof, the pattern information of the block and the value information connected with it are first derived from the picture information. The pattern information can be derived, for example, by creating a binary picture of the block by using the block picture information. The value information connected with the pattern information, for example, the value information of an area of a binary picture, can be derived from the original picture information by defining, for example, the average or the median for the pixel values of the area, or by selecting the value of a certain pixel in the area as the value information. To code pattern information for a pattern, a pattern model with greatest resemblance to the pattern in question is searched for, and the code of this pattern model is set as the pattern information code. If the most resembling model differs too much from the pattern, it can be coded more closely, or the method of the invention can be applied to parts of the block, so called sub-blocks, for which there is a predefined group of sub-block pattern models.

FIG. 1 presents, as binary pictures, a predefined group of pattern models for blocks of 8×8 pixels and sub-blocks of 4×4 pixels that is an embodiment of the invention. There are 192 block pattern models and 47 sub-block pattern models. The pattern models have been designed to represent, in the best possible way, as many patterns occurring in practice as possible. So, most of the block pattern models have only one contour, but there is also a representative group of models that have two contours. Additionally, the models include some checkered patterns and some more dense line patterns, so-called dense patterns, which are useful, for example, when coding hair or corresponding patterns with small features.

In principle, the pattern models can be given any suitable codes. In the example in FIG. 1, the pattern models of a block 8×8 pixels, which can be used in most cases to present the block pattern information accurately enough, can each be given, for example, an 8-bit code, leaving possible 8-bit codes for also presenting the pattern models that are more closely described. On the other hand, it is possible to use variable length coding in coding the pattern information, in which case the most often repeated pattern models are given shorter codes. This saves coding capacity for presenting the more closely described models, or for including pattern models for all of the fourth sub-blocks in the pattern information code. It is clear for a person skilled in the art that, for example, within the limits of the 8 pattern information bits reserved for one block, it is possible to use several different coding methods.

It is clear for a person skilled in the art, that the current picture analysis methods offer, in addition to the development of the binary picture, other possibilities to derive the pattern information contained in the block picture information. In the transmission encoder, where the coding of the picture information is done, there is usually a large amount of of calculation capacity, which makes it possible to use different picture analysis methods. Also, the comparison between the pattern, which corresponds with the derived pattern information, and the pattern models can be implemented in many different ways. One useful solution is to simply compare to pattern in some order to all possible models and choose the most appropriate model. The closer defining of a model can also be done, if necessary, simply by trying certain defined alternatives in some order, for example, in the order based on their probability.

Figure 2:
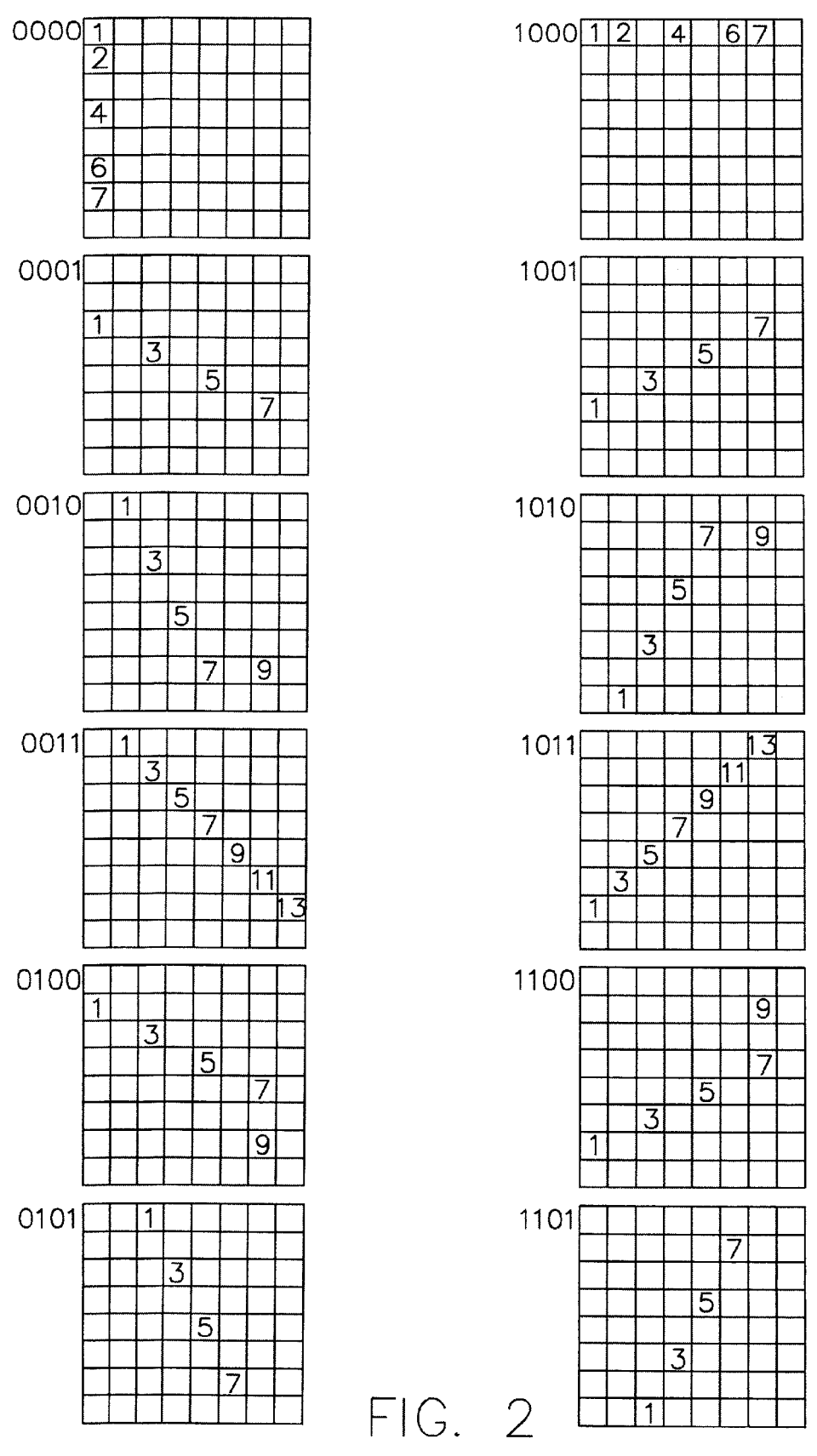

FIG. 2 relate to an embodiment of the invention, in which the direction and location of the contours in patterns are analyzed, and the pattern information is coded by combining the direction code and the location code of the contour. This embodiment is examined by using a case, in which there is only one direction, i.e., all the contours in a given block have the same direction in the pattern. FIG. 2 presents, as examples, 12 block drawings, in which all the contours marked as bold have a certain general direction and, at the same time, a certain shape. In the upper left corner of each drawing, there is a 4-bit direction code corresponding with this direction. The location of the contour in the block has been marked in the drawings by using number 1, 3, 5, 7 etc., which can be coded in a requested way. If the location code is also presented by using 4 bits, a total of 8 bits are needed to define the pattern models of this example.

In the following, one method of converting the block picture information into a binary picture, which defines the contours of the pattern, is presented as an example. The size of the block is 8×8 pixels. Let us count horizontally the absolute values for the differences of the pixels of a line in the following manner:

$$D_i = |P_i - P_{i+1}|$$

$$D_7 = 0$$

in which i is given values 0, 1, . . . , 6, and $D_i$=the absolute value of the difference in pixel i $P_i$=the value of pixel i If the pixels of the line get values of 32, 30, 29, 10, 11, 20, 18, and 19, the corresponding differences are 2, 1, 19, 1, 9, 2, 1, and 0. The differences are converted to binary values of using a threshold value. The values that are greater than or equal to the threshold value are set at 1. The threshold value can be, for example, one fourth of the largest difference, in this case 4.75. After applying the threshold value, the differences are:

00101000

Now we start from the left and mark all zeros as 0 until we find the number 1, after which all zeros are marked at 1. If we find another number 1, the zeros following that are marked as 0. In this way we get the binary values corresponding with the pixels of the line:

00111000

By repeating this operation for every line, the vertical contours included in the block can be distinguished, and a horizontally calculated binary picture of the block is obtained. In this binary picture, there is, for each pixel, a binary value derived from the absolute values of the differences of the pixels in the way described above.

By making the corresponding calculations vertically for the pixels of every line in the block, the horizontal contours included in the block can be distinguished, and a vertically calculated binary picture of the block is obtained. In order to form the final binary picture, the binary value of the pixel in the vertically calculated binary picture and the binary value of the pixel in the horizontally calculated binary picture are logically summed up for each pixel. FIG. 3 presents an example of a binary picture, which contains one contour, which is defined by the pixel borders between the pixels that have different binary values. From the alternatives in FIG. 2, the contour of the alternative that has the closes resemblance to this contour has been inked in FIG. 3.

The next stage of the method is to calculate the direction of the contours included in the binary picture. The calculation proceeds, in accordance with the example in FIG. 3, in the following manner. Subtract the binary value of each pixel on the horizontal line 1 from the value on the same vertical line of the horizontal line 0, each binary value on the horizontal line 2 from the corresponding value on the horizontal line 1, and so on, and finally, each binary value on the horizontal line 7 from the corresponding value on the horizontal line 6. The differences on each vertical line are marked below the vertical lines in FIG. 3. The difference are summed up, and the sum is marked with the symbol Σve. Correspondingly, subtract the binary value of each pixel on the vertical line 1 from the value on the same horizontal line of the vertical line 0, and so on, and finally, each binary value on the vertical line 7 from the corresponding value on the vertical line 6. The differences are marked beside the horizontal lines on the right side of the picture. The differences are summed up, and the sum is marked with the symbol Σpe. If Σve and Σpe differ from 0, calculate the ratio.

$R=\Sigma ve/\Sigma pe$

The direction code is defined on the basis of the ratio R by using a look-up table. The direction and their corresponding codes can be defined by a requested accuracy. Table 1 is an example of a look-up table used for defining a direction code.

TABLE 1

| R = Σve/Σpe | Direction | R = Σve/Σpe | Direction |
| --- | --- | --- | --- |
| 0 < R < 0.35 | 0001 | 0 > R > −0.35 | 1001 |
| 0.35 < R < 0.75 | 0010 | −0.35 > R > −0.75 | 1010 |
| 0.75 < R < 1.3 | 0011 | −0.75 > R > −1.3 | 1011 |
| 1.3 < R < 3 | 0100 | −1.3 > R > −3 | 1100 |
| R > 3 | 0101 | R < −3 | 1101 |

If Σve=Σpe =0, the area is plain without any contours. If Σve=0 and Σpe≠0, the pattern has a vertical contour, whose code is 1000. If Σpe=0 and Σve≠0, the pattern has a horizontal contour, whose code is 0000. In the example of FIG. 3, Σve=8 and Σpe=3, so R=2.67 and the corresponding direction code from the table above is 0100.

The location of the contour in a pattern can be found by calculating the amount of occurrences of the number 1 (or, correspondingly, 0) in the binary picture. The calculation starts from the upper (or lower) left corner and proceeds by vertical line. Occurrences of the number 1 are calculated along the line until 0 is found, in which case the calculation is continued from the next line. The amount of occurrences of the number 1 is compared with the amount given in a direction code specific table. In the example in FIG. 3, there are 29 occurrences of the number 1. The closest value given in a table would be 32, when calculated from the model of the pattern models in FIG. 1, which has the greatest resemblance to the pattern. The contour corresponding with this value is inked in FIG. 3. The contour recognition can be executed by using the amount of occurrences of the number 1 or 0. The location of the contour is stated in a requested coded form.

The direction and location codes together form a code, which is used in reconstruction of the picture to select, for example, from the models of FIG. 1, the pattern model that most resembles the block.

The difference between the pattern derived from the picture information and the pattern model that most resembles it, can be defined, for example, by calculating the number of pixels in the areas where the contours of the model and the pattern differ. If the difference exceeds the allowed limiting value, the model is defined more closely by adding to it, for example, a cross line of 2 pixels, and redefining the difference after that.

One way of finding a more accurate model for the block pattern is to divide the block into sub-blocks, and to search for a pattern model for each of the sub-blocks, in the way described above, from a group of predefined sub-block pattern models. One alternative is to convert the sub-block to a greater number of pixels, so that, block pattern models can be used a sub-block patter models. Naturally, in this case, information about the zooming must be added to the block code, for example, by using an appropriate prefix, in order to reconstruct the block in the correct size.

One way of defining the block pattern more closely is to apply to the block a model, which contains a so-called dense pattern, which contains, for example, lines of a small amplitude on a solid background. Dense patterns are useful, for example, in coding hair or other fine details.

A coded block can be reconstructed, by using a pattern model and the value information connected with it, either as it is or by using an appropriate low pass filtering. An alternative is an interpolated reconstruction, in which, in addition to the pattern mode, the pixels, which are in the borders of the adjacent blocks and which border on the block being processed, are also used. FIG. 4 illustrates a reconstruction, in which intermediate pixel values are recovered by interpolation. The pixel values of the pixels contained in the different areas of the block are interpolated by using the pixels of block A, B and C, which are next to the block. In the light area in FIG. 4, first the intervals $C_{77}$–$D_{77}$ and $B_{77}$–$D_{77}$ are interpolated, and then, by using these interpolated values, the rest of the pixels are interpolated. One possible order of interpolation is presented by the arrows in FIG. 4. For example, the interval $C_{77}$–$D_{77}$ has the following interpolated values:

$(7C_{77}+D_{77})/8$, $(6C_{77}+2D_{77})/8$, $(5C_{77}+3D_{77})/8$, $(4C_{77}+4D_{77})/8$, $(3C_{77}+5D_{77})/8$, $(2C_{77}+6D_{77})/8$, $(C_{77}+7D_{77})/8$,

The subjective accuracy of the reconstruction can be increased by dividing, in the reconstructed picture, each pixel into four smaller pixels, so that, the size of the reconstruction block is 16×16 pixels. Also, the contour of the reconstructed picture must be modified. FIG. 5 presents the conversion of an 8×8 pixel block into a 16×16 block by dividing each pixel into four smaller pixels. The dark area in the figure is the pattern after the contour has been modified. In this way, the picture can be reconstructed for a great number of pixels without the contours becoming staggered. It should be noted that the converting of a picture for a greater number of pixels during reconstruction does not require the addition of any extra information during the coding.

When a video picture in transferred by using a compression method, in which only the information of the changed blocks is transferred, the method of the invention can be used to code the changed blocks with a very small amount of information. For example, when the pattern is coded by using 8 bits, and two pieces of value information, for example, gray scales, are DPCM coded by using 3 bits each, the coding of the block requires 8+3+3=14 bits. As was stated earlier, the pattern code can be shorter in some cases. For example, a pattern, which has a solid area with a vertical and a horizontal contour, can be stated by using a code, which includes a code for the solid area and the value of the pattern's corner pixel in the block.

The advantage of this method, in comparison with the known method, is that the compressed information is the pattern information of the block. In this way, the contrast of the original picture can be retained. Additionally, the quality of the reconstructed picture can be increased by fitting the contours of the pattern into the patterns of the adjacent blocks by interpolating the border pixels of the block into the adjacent blocks, and by converting the reconstructed picture into a greater number of pixels and applying an contour modification to it.

The described invention is not limited to the examples presented above, but it can be applied within the limits of the following claims.

What is claimed is:

1. A video compression method, in which a video picture is divided into blocks containing several pixels and in which the picture information of each block is formed by the value information of that block's pixels, comprising, in order to code the picture information of a block, the steps of:

deriving block pattern information from the picture information of the block, by defining the direction and location of a contour inside the block relative to the borders of the block and by forming a pattern information code from a direction code corresponding with the direction of the contour and a location code corresponding with the location of the contour, deriving value information connected with the block pattern information from the picture information of the block, assigning a value information code to the derived value information, preparing a relatively small group of block pattern models beforehand, and assigning a relatively short code for each block pattern model prepared, searching for a block pattern model that most resembles the pattern of the block, as defined by its derived block pattern information, from among the relatively small group of block pattern models, setting the relatively short code assigned for the block pattern model that most resembles the pattern of the block as the pattern information code for the block, and combining the pattern information code for the block with the value information code.

2. A video compression method in accordance with claim 1, wherein, if the difference between the pattern defined by the block pattern information and the pattern model that most resembles the pattern of the block exceeds a predefined limit value, the block in divided into sub-blocks and coding in accordance with the coding applied to picture information of the block is applied in a corresponding manner to the sub-blocks, such that pattern models that most resemble the patterns of the sub-blocks are searched for from a predefined small group of sub-block pattern models.

3. A video compression method in accordance with claim 2, wherein the size of a block is 8×8 pixels and the size of a sub-block is 4×4 pixels.

4. A video compression method in accordance with claim 1, wherein the pattern information code has 8 bits.

5. A video compression method in accordance with claim 1, wherein the pattern information code is of a variable length.

6. A video compression method in accordance with claim 1, wherein the value information code includes two pieces of value information, both of which are DPCM coded.

7. A video compression method in accordance with claim 1, wherein the block pattern model is a binary representation of the block, in which the pixels have binary values, and the block pattern information is derived from the picture information of the block by generating therefrom binary values for the pixels of the block.

8. A video compression method in accordance with claim 1, wherein the direction and the direction code of the contour inside the block are defined relative to the borders of the block by using a binary representation of the block and by the steps of:

subtracting the binary value of each pixel in the horizontal line (n+1) from the value on the same vertical line of the horizontal line n, where n=0, 1, . . . , (s-1) and s is the number of horizontal lines in the binary representation, and calculating the sum of the differences ($\Sigma$ve), subtracting the binary value of each pixel in the vertical line (m+1) from the value on the same horizontal line of the vertical line m, where m=0, 1, . . . , (t-1) and t is the number of horizontal lines in the binary representation, and calculating the sum of the differences ($\Sigma$pe), calculating the ratio of the obtained sums ($\Sigma$ve/$\Sigma$pe), if both sums differ from 0, and by selecting a direction code corresponding with the ratio from a look-up table, which contains the value ranges of the ratio and the direction codes corresponding with them, and setting as the direction code a code of a plain area, if both sums are equal to 0, a code of a vertical contour, if only the first sum (Σve) is equal to 0, and a code of a horizontal contour, if only the second sum (Σpe) is equal to 0.

9. A video compression method in accordance with claim 1, wherein the location and the location code of the contour are defined by using a binary representation of the block and summing up the number of occurrences of the number 1 or, correspondingly, 0, line by line in a horizontal direction starting from the left side of the line and ending at the first 0 or, correspondingly, 1, and by setting as the location code the location code corresponding with the obtained total number and the defined direction code.

10. A method for reconstructing a picture that has been compressed by using the method of claim 1, comprising the steps of:

receiving the code corresponding with the picture information of the block and containing the pattern information code and the value information code, forming a pattern in accordance with the pattern information code by using a pattern model, and adding value information to the pattern in accordance with the value information code to form a reconstructed block of the reconstructed picture.

11. A method in accordance with claim 10, wherein the value information of the pixels in a reconstructed block is defined more accurately by improving the continuity of contours at the borders of the block and adjacent blocks.

12. A method in accordance with claim 10, wherein the value information of the pixels in a reconstructed block is defined more accurately by interpolation using pixels, which are in the borders of adjacent blocks and which border on the block that is being processed.

13. A method in accordance with claim 10, wherein the accuracy of the reconstructed pattern is increased by converting the reconstructed pattern to a large number of pixels than the original reconstructed pattern by the steps of:

dividing each pixel into several pixels, and modifying the contour of the pattern in order to eliminate staggering.

* * * * *

UNITED STATES PATENT AND TRADEMARK OFFICE
CERTIFICATE OF CORRECTION

| | | |
|---|---|---|
| PATENT NO. | : 6,304,605 B1 | Page 1 of 1 |
| APPLICATION NO. | : 08/793897 | |
| DATED | : October 16, 2001 | |
| INVENTOR(S) | : Haikonen et al. | |

It is certified that error appears in the above-identified patent and that said Letters Patent is hereby corrected as shown below:

Title page, Col. 1 item (*) Notice: delete "This patent is subject to a terminal disclaimer.", therefor.

Signed and Sealed this

Thirtieth Day of October, 2012

David J. Kappos
*Director of the United States Patent and Trademark Office*